United States Patent [19]
Urano et al.

[11] Patent Number: 5,754,235
[45] Date of Patent: May 19, 1998

[54] BIT-RATE CONVERSION CIRCUIT FOR A COMPRESSED MOTION VIDEO BITSTREAM

[75] Inventors: Takashi Urano, Matsudo; Koichi Tsuchikane, Koganei; Satoko Kobayashi, Yokosuka, all of Japan

[73] Assignee: Sanyo Electric Co., Ltd., Moriguchi, Japan

[21] Appl. No.: 410,490

[22] Filed: Mar. 24, 1995

[30] Foreign Application Priority Data

Mar. 25, 1994 [JP] Japan .................. 6-056022

[51] Int. Cl.⁶ .................................. H04N 11/02
[52] U.S. Cl. ................. 348/405; 348/390; 348/411; 375/245
[58] Field of Search ..................... 348/390, 387, 348/405, 420, 422; 375/241, 245, 246; 370/84, 112, 471, 474; 358/426; 386/33, 46, 109, 112

[56] References Cited

U.S. PATENT DOCUMENTS

| | | | |
|---|---|---|---|
| 4,985,784 | 1/1991 | Tsaboi et al. | |
| 5,122,875 | 6/1992 | Raychaudhuri et al. | 375/240 |
| 5,231,484 | 7/1993 | Gonzales et al. | |
| 5,278,646 | 1/1994 | Civanlar et al. | 348/384 |
| 5,283,646 | 2/1994 | Burder | 348/390 |
| 5,293,229 | 3/1994 | Iu | |
| 5,325,125 | 6/1994 | Naimpally et al. | |
| 5,402,244 | 3/1995 | Kim | 358/430 |
| 5,440,345 | 8/1995 | Shimoda | 348/402 |
| 5,452,007 | 9/1995 | Enari et al. | 375/240 |
| 5,521,940 | 5/1996 | Lane et al. | 375/240 |
| 5,537,619 | 7/1996 | Higurashi et al. | 375/240 |
| 5,570,197 | 10/1996 | Boon | 348/390 |
| 5,617,142 | 4/1997 | Hamilton | 348/405 |

FOREIGN PATENT DOCUMENTS

| | | |
|---|---|---|
| 0 559 593 | 2/1993 | European Pat. Off. |
| 92 01657 | 2/1992 | France |
| 1-200793 | 8/1989 | Japan |
| 5-252507 | 9/1993 | Japan |
| 5-276502 | 10/1993 | Japan |
| 6-164408 | 6/1994 | Japan |
| 6-225284 | 8/1994 | Japan |
| 7-59091 | 3/1995 | Japan |
| WO93/16541 | 8/1993 | WIPO |

*Primary Examiner*—Wellington Chin
*Assistant Examiner*—Soon-Dong Hyun
*Attorney, Agent, or Firm*—Armstrong, Westerman, Hattori, McLeland & Naughton

[57] ABSTRACT

An input bitstream (a first bitstream) is divided into a main code having a changeable length and the remaining data. The main code is subjected to a bit-rate conversion and combined with the remainig data to output a second bitstream. By this arrangement, the configuration of the bit-rate conversion circuit can be simplified and delay in the conversion process can be reduced. Incidentally, the main code corresponds to the DCT-coefficient data(e) and the quantizer scale(d), while the remaining data corresponds to the header data(a), the handling type data(b) and the motion vector data(c) respectively. Furthermore, by using the fact that if the quantizer scale is enlarged and the compression rate is raised, the degradation of a reproduced picture with a large DCT-coefficient's value of higher frequency terms is not conspicuous but the degradation of a reproduced picture with a small DCT-coefficient's value of higher frequency terms is conspicuous, and by changing the compression rate based on the DCT-coefficient's value of higher frequency terms, a bitstream with a low bit-rate but a small degradation in the reproduced picture quality can be obtained.

38 Claims, 10 Drawing Sheets

Fig.2

| | COMPARISON of DATA(A) and DATA(B) | |
|---|---|---|
| | DATA CONTENTS | DATA LENGTH |
| a | header data | SAME | SAME |
| b | handling type data (Macroblock Type : MBT) | SAME | SAME |
| c | motion vector data | SAME | SAME |
| d | quantization step size data (Quantizer Scale : QSC) | DIFFERENT | SAME |
| e | coefficient data | DIFFERENT | DIFFERENT |
| a1 | picture type data (Picture Coding Type : PCT) | SAME | SAME |
| a2 | bit rate data (Bit-Rate Value : BRV) | DIFFERENT | SAME |

BIT-RATE CONVERSION CIRCUIT FOR A COMPRESSED MOTION VIDEO BITSTREAM

BACKGROUND OF THE INVENTION

1. Field of the Invention

The present invention generally relates to a circuit which converts a bit-rate of a bitstream obtained by compressing digital motion video signals and an apparatus and method therefor. More particularly, the present invention relates to a circuit which changes a bit-rate of a bitstream in conformity to the MPEG standard proposed by The International Standards Organization's Moving Picture Experts Group (MPEG) and an apparatus and method therefor by way of example.

2. Description of the Related Art

As techniques for compressing a moving picture signal into a bitstream, predictive/interpolative motion compensation, orthogonal transformation, quantization, variable length coding, etc. are used.

For example, the predictive/interpolative motion compensation, a discrete cosine transformation (DCT), adaptive quantization and Huffman coding have been adopted by the MPEG standard. The MPEG-1 standard is provided in the "ISO/IEC 11172," while the MPEG-2 standard is provided in the "ISO/IEC 13818."

As examples of prior art related to the above fields, there have been techniques disclosed in the U.S. Pat. No. 4,985,784 (the Japanese Unexamined Patent Publication No. 200793/1989), the U.S. Pat. No. 5231484 (the Japanese Unexamined Patent Publication No. 252507/1993), the U.S. Pat. No. 5,293,229 (the Japanese Unexamined Patent Publication No. 276502/1993), the U.S. Pat. No. 5,325,125 (the Japanese Unexamined Patent Publication No. 225284/1994) and the Japanese Unexamined Patent Publication No. 164408/1994.

In the above DCT, each block divided into 8×8 pixels is transformed into an 8×8 coefficient matrix |Cij|. Hereafter in this specification, suffixes "i" and "j" denote "i rows, j columns."

In the above adaptive quantization, each coefficient Cij of the 8×8 coefficient matrix |Cij| is divided by a certain divisor {(a constant proper to a quantizer scale Q)×(the constant proper to the coefficient Cij)} and the reminder is rounded off. Here, the constant proper to the each coefficient Cij is given in a quantization matrix table |Kij|. Incidentally, in the quantization matrix table |Kij| for the intra-block, a value of the each constant kij is large for the coefficient of the high frequency term and small for the coefficient of the low frequency term.

In the above adaptive quantization, a bit-rate of an outputted bitstream is monitored and the above quantizer scale Q (quantization step size Q) is determined so that the bit-rate can meet the target value. That is, when the bit-rate is less than the target value, the quantizer scale Q is controlled to be smaller, and when the bit-rate is greater than the target value, the quantizer scale Q is controlled to be greater.

In the above Huffman coding, each code word is allocated according to the frequencies of occurrence of each coefficient C'ij after quantization so that the code word can be shorter as the frequencies of occurrence become higher.

The larger the above quantizer scale Q is, the higher the data compression rate is and the lower the bit-rate is, i.e., the smaller the amount of data is. Furthermore, the lower the bit-rate is, the lower the picture quality of a reproduced image is, but the smaller loads on the transmission and other systems are. For this reason, an industrial broadcasting apparatus, which is a transmission means for production, should have a high grade bitstream with a high bit-rate. On the other hand, a household apparatus, which is a transmission means for distribution, should have a low grade bitstream with a low bit-rate with a small load on the apparatus. Accordingly, an apparatus which can convert a bitstream from a first bit-rate to a second bit-rate has been required.

The above bit-rate has two types: fixed bit-rate and variable bit-rate. When the bit-rate is variable, the range thereof is from 2 Mbps to 4 Mbps with an average of 3 Mbps, for example. This is to make possible that considering a scene in which the degradation in the picture quality is not conspicuous when the compression rate is raised and a scene in which the degradation in the picture quality is conspicuous when the compression rate is raised and in the former scene the bit-rate is lowered and in the latter scene the bit-rate is raised. Incidentally, in the above coefficient matrix |Cij|, when the quantizer scale Q is enlarged and the compression rate is raised, the degradation in the picture quality is not conspicuous in a picture with a large coefficient's value of high frequency terms, but when the quantizer scale Q is enlarged and the compression rate is raised, the degradation in the picture quality is conspicuous in a picture with a small coefficient's value of high frequency terms.

In the conventional apparatus which changes a bit-rate, the above bitstream is expanded, the motion video data is reproduced and this motion video data is compressed again and a bitstream with a desired bit-rate is obtained. In other words, in the conventional apparatus of bit-rate change type, an MPEG encoder is disposed behind a MPEG decoder, and the bit-rate of the bitstream outputted from the MPEG encoder is monitored and the above quantizer scale Q is controlled so that the bit-rate value can meet the target value (=the value specified as the bit-rate after conversion).

In the above MPEG decoder, well-known processings such as variable length decoding (=inverse variable length coding), inverse quantization, inverse DCT and the predictive/interpolative motion compensation are performed.

In the predictive/interpolative motion compensation, a picture preceded in time and/or a picture following in time are added to expanded data. For this purpose, it is necessary to provide a memory (frame memory) for storing the picture preceding in time and the picture following in time. Furthermore, because the picture following in time is added, an amount of delay is caused which is as much as the added picture following in time.

In the above MPEG encoder, well-known processings such as the predictive/interpolative motion compensation, the DCT, the adaptive quantization and the variable length coding are performed.

In the predictive/interpolative motion compensation, a picture preceding in time and/or a picture following in time are subtracted from incoming motion video data. Therefore, it is necessary to provide a frame memory for storing the picture preceding in time and the picture following in time. It is also necessary to provide a local inverse quantization circuit and a local inverse DCT circuit for reproducing the picture preceding in time and the picture following in time. Furthermore, as the picture following in time is subtracted, an amount of delay is caused which is as much as the subtracted picture following in time.

As a matter of course, a circuit configuration of the conventional apparatus for bit-rate change type directly connected to the MPEG decoder and the MPEG encoder is complicated, large sized and expensive, and moreover, the delay in processing is large in this circuit configuration.

SUMMARY OF THE INVENTION

In view of the above, a primary object of the present invention is to provide a circuit of bit-rate conversion type in which a circuit configuration is comparatively small-sized and the delay in processing is small and an apparatus and method therefor.

Another object of the present invention is to provide a circuit which can change a bit-rate to produce a bitstream with the optimum picture quality and optimum amount of data according to the situation in which the bitstream after the bit rate conversion is either a bitstream for the industrial apparatus or a bitstream for the household apparatus and an apparatus and method therefor.

Still another object of the present invention is to provide a circuit which can convert a bitstream from a fixed bit-rate to a variable bit-rate, from a variable bit-rate to another variable bit-rate or from a fixed bit-rate to a variable bit-rate as well as from a fixed bit-rate to another bit-rate and an apparatus and method therefor.

As is well-known, a bitstream under the MPEG standard consists of data whose value varies according to a bit-rate (hereinafter referred to as "main data having a changeable length") and data whose value remains unchanged irrespective of the bit-rate (hereinafter referred to as "remaining data"). The main data corresponds to coefficient data or quantizer scale data (quantization step size data). The remaining data corresponds to header data, handling type data, motion vector data, etc. respectively. The present invention has directed attention to this fact and aims to achieve the above objects by taking out the main data from the bitstream, applying a bit rate conversion to the main data only, and replacing the converted main data into the bitstream.

Furthermore, the present invention has directed attention to the fact that the degradation in the picture with a large coefficient's value of high frequency terms is not conspicuous when the quantizer scale Q is enlarged and the compression rate is raised while the degradation in the picture with a small coefficient's value of high frequency terms is conspicuous when the quantizer scale Q is enlarged and the compression rate is raised and aims to control quantizer scale Q optimally according to coefficient's value of high frequency terms and to change the bit-rate without so much degrading the picture quality. The present invention also aims to comply with any case according to whether the bitstream to be inputted has a variable bit-rate or a fixed bit-rate or whether the bitstream to be outputted has a variable bit-rate or a fixed bit-rate.

BRIEF DESCRIPTION OF THE DRAWINGS

FIG. 2 shows the comparison of the data contents and data length of the two bitstreams illustrated in FIG. 1;

DETAILED DESCRIPTION OF THE PREFERRED EMBODIMENTS

In the following description, although bitstreams conforming to MPEG-2, which is a standard for bit-rates of 100 Mbps or less, will be described, the present invention is not limited to the MPEG-2 standard. That is, the present invention can also be applied to a bitstream which can change a bit-rate by controlling the quantizer scale of such as bitstreams conforming to H.261, which is a standard for videophone or videoconference and the MPEG-1 standard as well.

Firstly, the relation between the bitstream and the bit-rate will be described.

Figure 1:
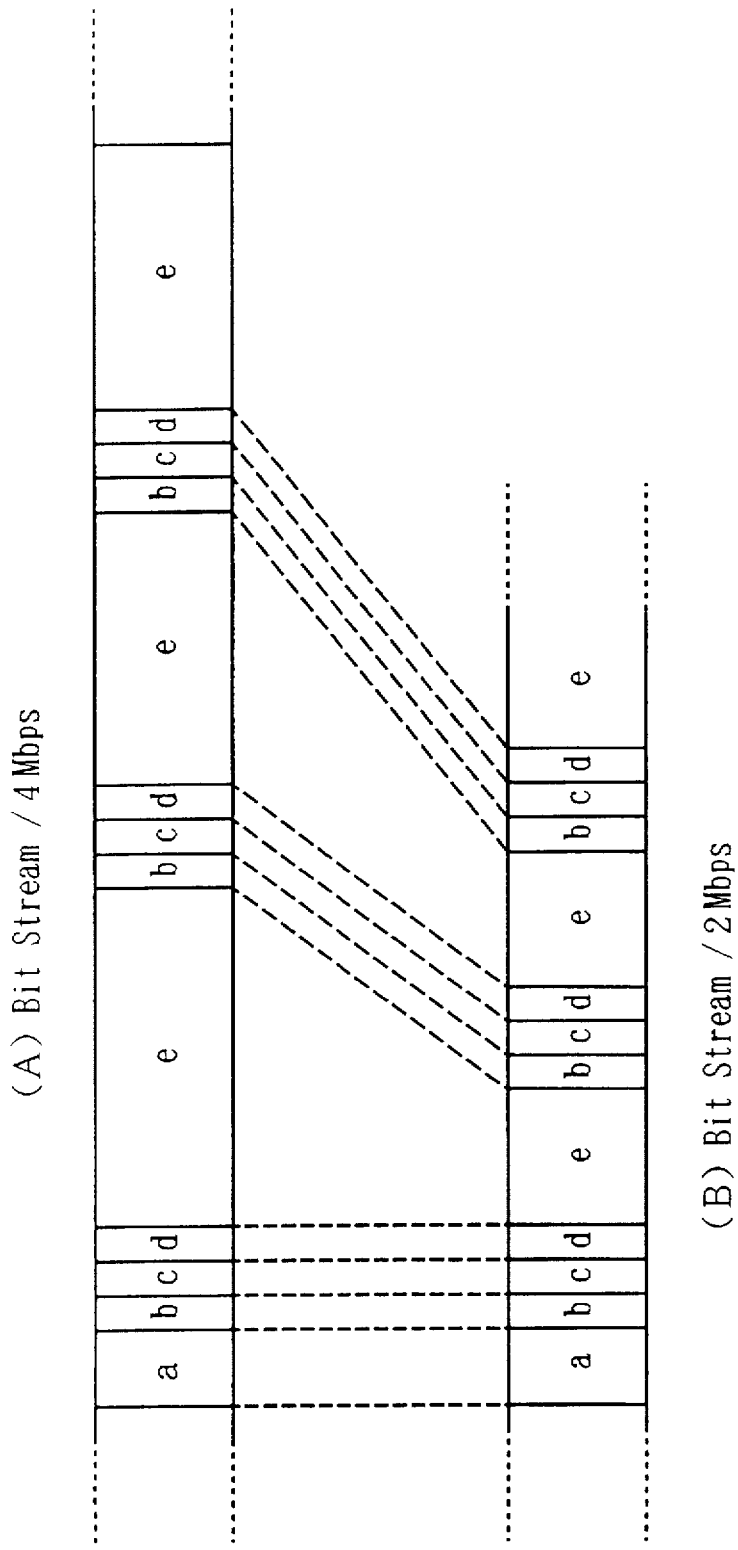
FIG. 1 illustrates a bitstream with a bit-rate of 4 Mbps and a bitstream with a bit-rate of 2 Mbps both obtained from the same motion video respectively.

As illustrated in FIG. 1, two different bitstreams under the MPEG-2 standard generated so as to be 4 Mbps and 2 Mbps, for example, are different from each other in data length. In this figure, (A) is a bitstream of 4 Mbps and (B) is a bitstream of 2 Mbps. The difference in data length is attributed mainly to a coefficient data(e). That is, the bitstream under the MPEG-2 is composed of a header data(a), a handling type data(b), a motion vector data(c), a quantizer scale data(d) and the coefficient data(e). In the header data(a) are included a picture type data(a1), a transfer bit-rate data(a2) and a picture size data(a3).

Among these codes, the data length of the coefficient data(e) greatly varies as the bit-rate varies for the reason that the bit-rate is converted by the change of the quantizer scale. On the other hand, as illustrated in FIG. 2, the header data(a), the handling type data(b), the motion vector data(c) and the picture type data(a1) are roughly the same as each other in data contents and a data length irrespective of the bit-rate changing.

Furthermore, the quantizer scale data(d) and the transfer bit-rate data(a2) are roughly the same as each other in a data length irrespective of the bit-rate changing but different from each other in data contents according to the bit-rate changing. Incidentally, under the MPEG-2 standard, the quantizer scale data (the quantization step size data) (d) is the "Quantize Scale Code (QSC)" of a slice layer and the "Quantize Scale Code (QSC) " of a macroblock layer, the coefficient data(e) is the data of a block layer,the handling type data(b) is the "Macroblock Type (MBT)" of a macroblock layer, the transfer bit-rate data(a2) is the "Bit-Rate Value (BRV)" of a sequence layer, and the picture type data(a1) is the "Picture Coding Type (PCT)" of a picture layer.

As evident from the above, in order to change the bit-rate, there is no need to newly operate the handling type data(b) and the motion vector data(c) but the inputted code may be used as it is. Here, "to operate" means to expand the bitstream into a motion video data by using an MPEG decoder and then compress the same into a bitstream by using the MPEG encoder. To be precise, when the bit-rate changes, the reproducing picture to be expanded by a local decoder built in the MPEG encoder changes, and therefore the handling type data(b) and the motion vector data(c) may slightly change, though this change is negligibly small. Accordingly, due to the conversion in bit-rate the coefficient data(e), the quantizer scale data(d) and the transfer bit-rate data(a2) all substantially change, and what substantially changes in data length is the coefficient data(e). The present invention make use of this fact.

Figure 3:
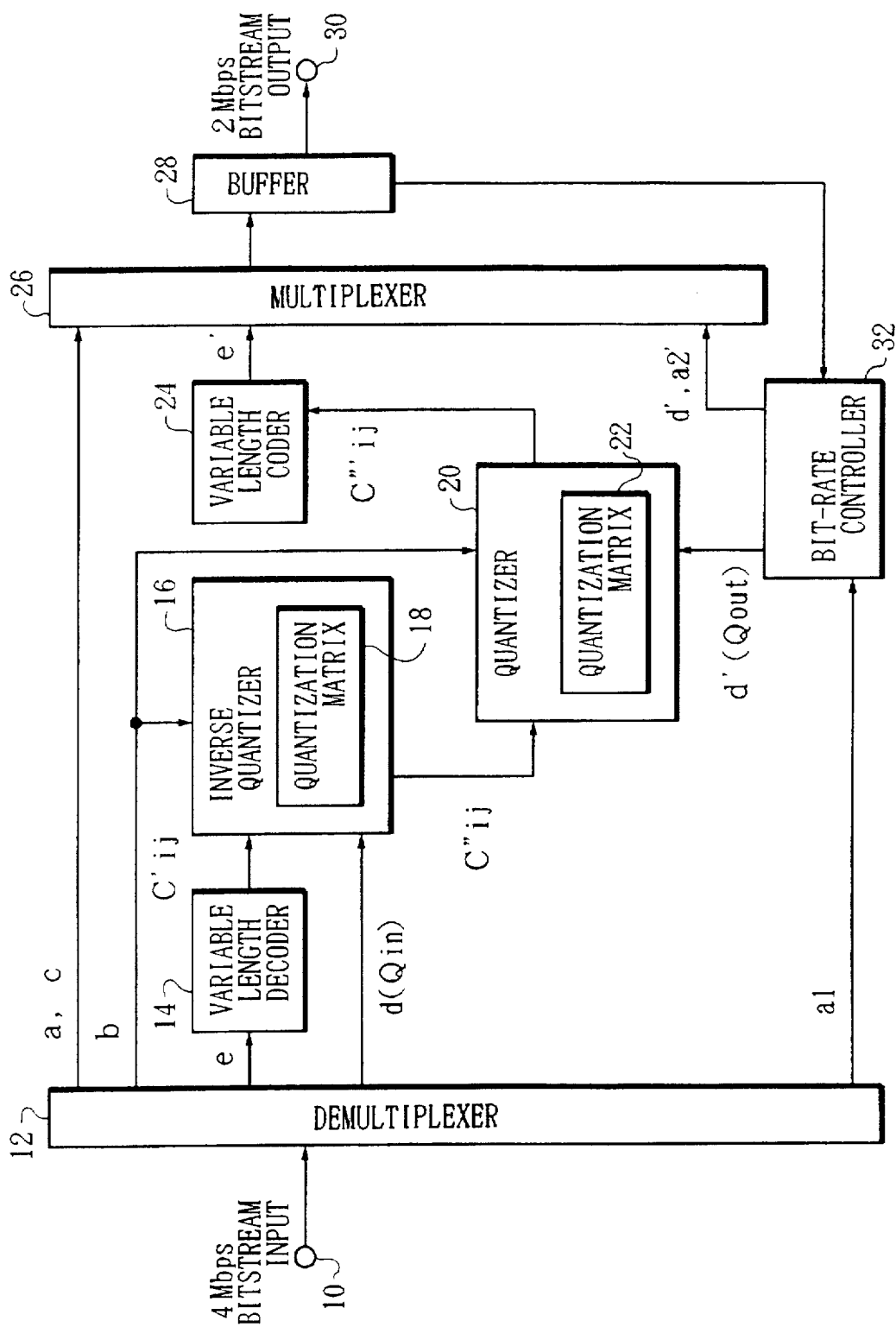
FIG. 3 is a block diagram illustrating the circuit configuration of an apparatus according to the first embodiment of the present invention.

Next, referring to FIG. 3, the first preferred embodiment will be described. Illustrated in FIG. 3 is a circuit for converting a bitstream with a bit-rate of 4 Mpbs into a bitstream with a bit-rate of 2 Mbps. Incidentally, converting the bitstream with a bit-rate of 4 Mbps into the bitstream with a bit-rate of 2 Mpbs may be specified by entering a command or may be specified by default.

Into an input terminal 10 of a bit-rate change circuit illustrated in FIG. 3 is inputted a bitstream (a first bitstream) with a bit-rate (a first bit-rate) of 4 Mbps under the MPEG-2 standard. This bitstream is separated by a demultiplexer 12 according to the above-described classification. That is, the handling type data(b) and motion vector data(c) whose data contents and data length remain unchanged are sent to a multiplexer 26. The coefficient data(e) whose data contents and data length change is sent to an inverse variable length coder (=variable length decoder) 14 and subjected to the variable length decoding thereby and further sent to an inverse quantizer 16 and subjected to the inverse quantization thereby. Specifically, each coefficient data C'ij after being subjected to the variable length decoding is multiplied by the quantizer scale Qin (a first quantizer scale) respectively and then multiplied by the constant Kij proper to the coefficient C'ij respectively. The first quantizer scale Qin is given by the incoming quantizer scale data(d) divided by the demultiplexer 12 and sent therefrom, while the constant Kij proper to each coefficient C'ij is given by a quantization matrix table 18.

Each coefficient data C"ij subjected to the inverse quantization in this way is then sent to a quantizer 20 to be quantized thereby. Specifically, each coefficient C"ij after being subjected to the inverse quantization is divided by the quantizer scale Qout (a second quantizer scale) respectively and further divided by the constant Kij proper to each coefficient C"ij. The second quantizer scale Qout is inputted from a bit-rate controller 32, while the constant Kij proper to each coefficient C"ij is given by a quantization matrix table 22. Here, the quantization matrix table 22 is the same in contents as the quantization matrix table 18 of the inverse quantizer 16. Furthermore, the bit-rate controller 32 monitors the state of a buffer 28, determines the second quantizer scale Qout so that a bit-rate (a second bit-rate) of a bitstream (a second bitstream) outputted from the buffer 28 can be 2 Mbps as specified, and sends the determined second quantizer scale Qout to the quantizer 20. For example, the bit-rate controller 32 monitors the occupied percentage or variation percentage of the buffer 28 and determines the second quantizer scale Qout to be a desired value. Incidentally, if the average of the amount of the data to be inputted into the buffer 28 is smaller than a specified bit-rate of 2 Mbps, the second quantizer scale Qout may be controlled to be smaller, and if the average is larger than the specified bit-rate of 2 Mbps, the second quantizer scale Qout may be controlled to be larger. Furthermore, for the determination of the second quantizer scale Qout, information whether the picture type is I picture, P picture or B picture is necessary for the reason that the target amount of the second bitstream depends on the picture type and therefore the second quantizer scale Qout is varied according to the picture type. This information is given by the incoming picture type data(a1) separated by the demultiplexer 12 and sent therefrom. On the other hand, in the inverse quantization and the quantization, information whether the current macroblock is intramacroblock or intermacroblock is necessary for the reason that the values of the Kij in the quantization matrix table 18, 22 are different between the intramacroblock and the intermacroblock. This information is given by the incoming handling type data(b) separated by the demultiplexer 12 and sent therefrom. Each coefficient data C"ij quantized in this way is sent to a variable length coder 24 and subjected to variable length coding into a coefficient data(e') and then inputted into the multiplexer 26.

Figure 4:
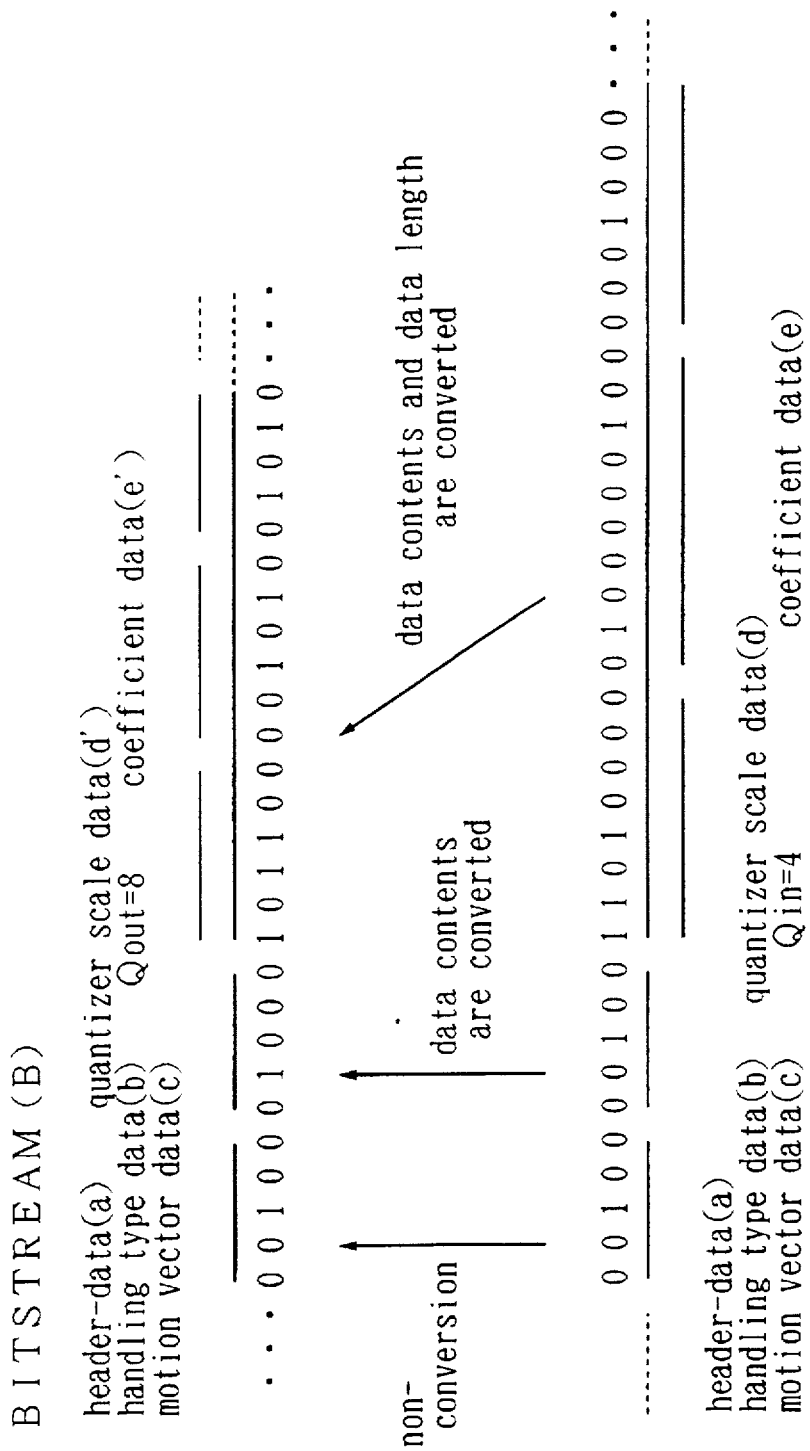
FIG. 4 illustrates a bitstream whose bit-rate was converted by the circuit illustrated in FIG. 3.

In the multiplexer 26, the incoming handling type data(b) and motion vector data(c) sent from the demultiplexer 12 and the incoming header data(a) excluding the transfer bit-rate data(a2) sent from the demultiplexer 12 are combined with the coefficient data(e') after transformation sent from the variable length coder 24, a quantizer scale data(d') corresponding to the second quantizer scale Qout sent from the bit-rate controller 32 and a transfer bit-rate data(a2') corresponding to the second bit-rate sent from the bit-rate controller 32, and this combined bitstream of 2 Mbps is outputted from an output terminal 30 through the buffer 28. As described above, the bit-rate conversion processing is performed through the circuit illustrated in FIG. 3, and as a result, as illustrated in FIG. 4, the bitstream (A) is converted into the bitstream (B).

Figure 5:
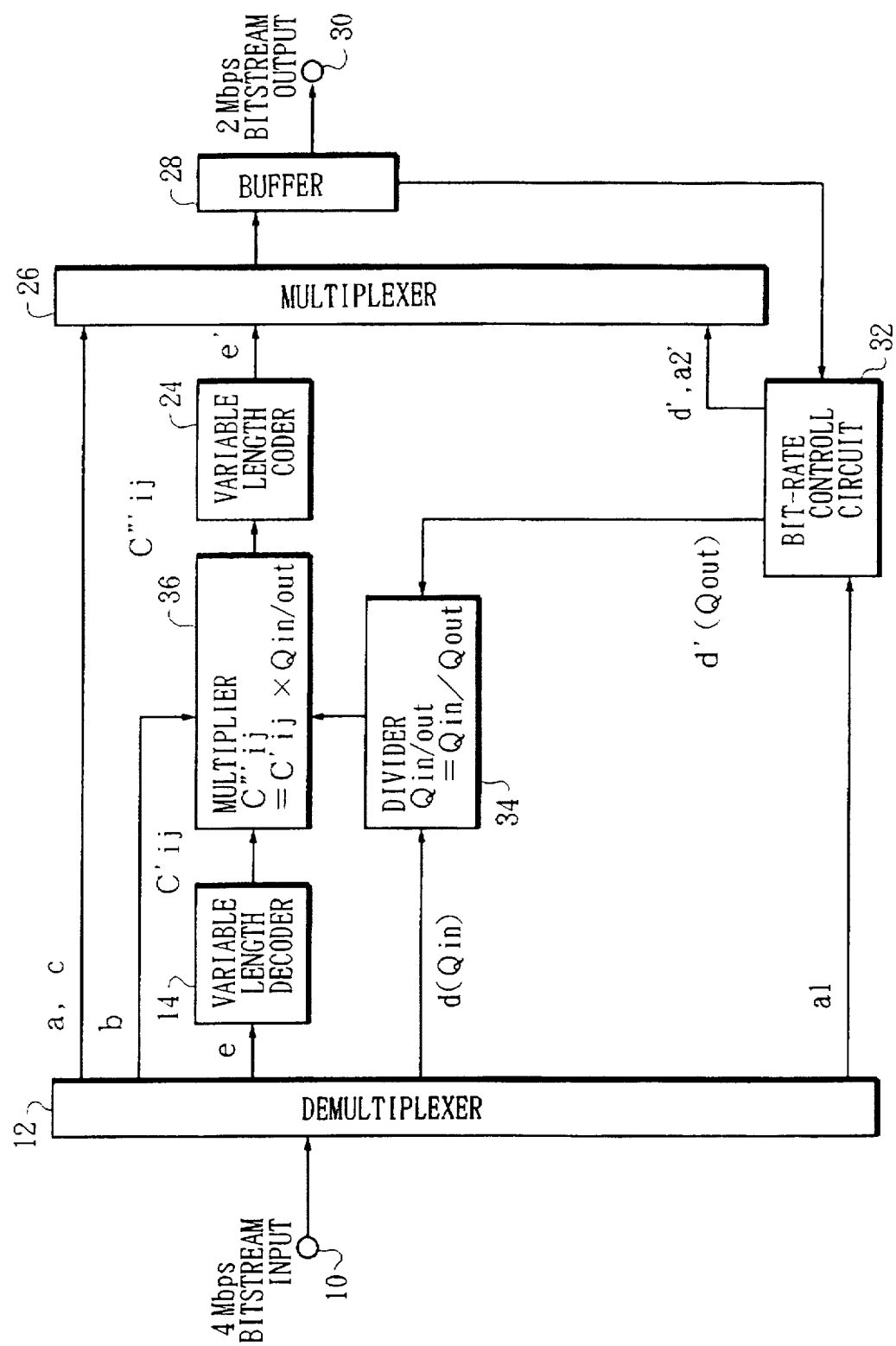
FIG. 5 is a block diagram illustrating the circuit configuration of an apparatus according to the second embodiment of the present invention.

Now, referring to FIG. 5, the second preferred embodiment will be described. FIG. 5 illustrates an example which has simplified the processing to be performed through the inverse quantizer 16 and the quantizer 20 hinted by the fact that the quantization matrix table 18 and the quantization matrix table 22 are the same in contents in FIG. 3. In the following description, the same reference numbers will be applied to the blocks common to FIG. 3 and the description thereof will be omitted.

Each coefficient output C"ij of the inverse quantizer 16 in FIG. 3 can be expressed by the following equation:

$$C''ij = C'ij \times Qin \times Kij$$

Here, Kij is the constant proper to each coefficient C'ij given by the quantization matrix table 18.

On the other hand, each coefficient output C'''ij of the quantizer 20 in FIG. 3 can be expressed by the following equation:

$$\begin{aligned} C'''ij &= C''ij \div Qout \div Kij \\ &= C'ij \times Qin \times Kij \div Qout \div Kij \\ &= C'ij \times Qin \div Qout \end{aligned}$$

By making use of the above, instead of the inverse quantizer 16 and the quantizer 20, a divider 34 and a multiplier 36 are provided in FIG. 5. The divdier performs division of Qin•out =Qin÷Qout, and the multiplier 36 performs multiplication of C'''ij=C'ij×Qin•out.

As described above, the example illustrated in FIG. 5 has achieved the equivalent function as that of the circuit illustrated in FIG. 3 by means of the simpler circuit compared therewith.

Figure 6:
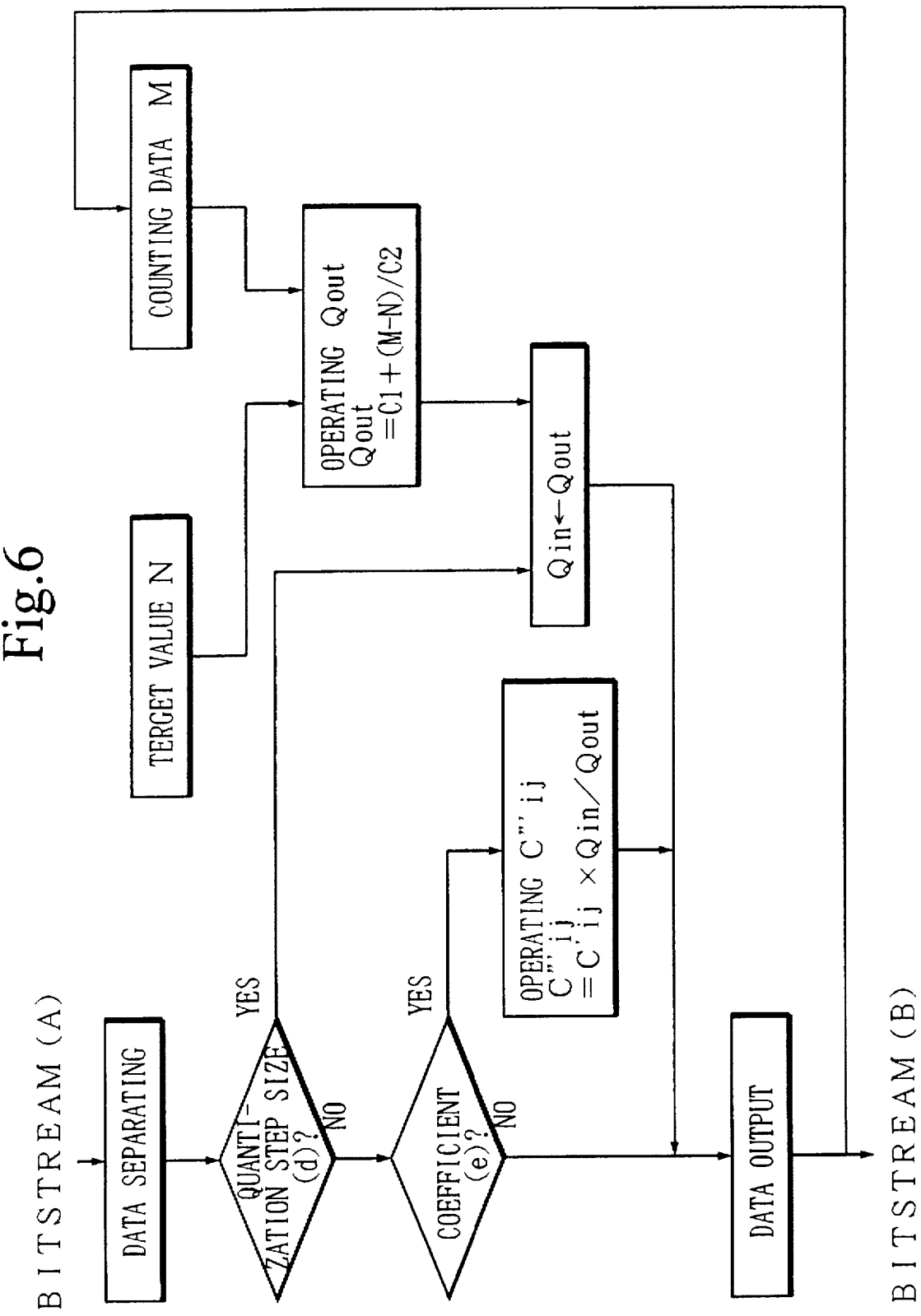
FIG. 6 is a flow chart for a case where the function of the apparatus illustrated in FIG. 5 is realized by software.

Next, an example which has achieved the change ofthe bit-rate of the circuit illustrated in FIG. 5 by using a CPU and software referring to FIG. 6.

Each data divided from the first bitstream is subjected to a judgment whether or not the data is the quantization step size data(d). If the judgment is positive, the data is converted into the second quantizer scale data(d') and outputted, that is, the first quantizer scale Qin is converted into the second quantizer scale Qout. The second quantizer scale Qout can be determined based on a target value N and a counted value M, for example, as expressed by the following equation:

$$Qout = C1 + (M-N)/C2$$

Here, C1 and C2 are constants.

On the other hand, if the above judgment is negative, that is, the data is not the quantizer scale data(d), a further judgment is performed whether or not the data is the coefficient data(e). If the judgment is positive, the data is converted into the second coefficient data(e), that is, the first coefficient C'ij is converted into the second coefficient C'''ij. As described above, the second coefficient C'''ij can be operated as expressed by the following equation:

$$C'''ij = C'ij - Qin + Qout$$

Incidentally, if the above judgment is negative, that is, the data is not the quantizer scale data(d) or the coefficient data(e), the data is outputted as it is.

Figure 7:
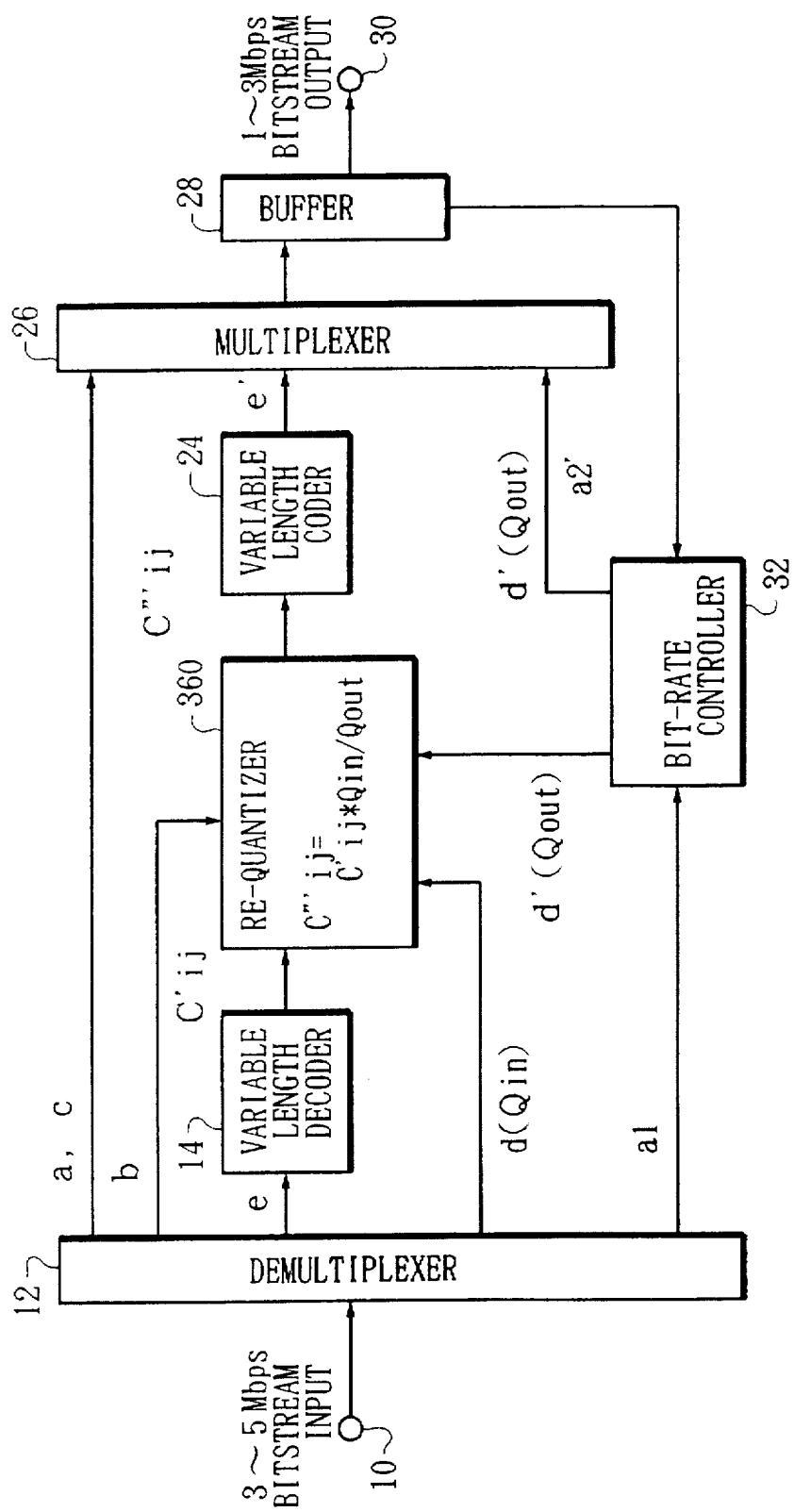
FIG. 7 is a block diagram illustrating the circuit configuration of an apparatus according to the third embodiment of the present invention which is partly different from the first and second embodiments respectively.

The circuit illustrated in FIG. 5 can also be modified into the circuit illustrated in FIG. 7. Specifically, the division performed by the divider 34 illustrated in FIG. 5 may be performed in a re-quantizer 360 instead. That is, in the re-quantizer 360, the following multiplication and the division may be performed:

$$C'''ij = C'ij \times Qin \div Qout$$

Furthermore, in FIG. 7, although all the bit-rates of the bitstreams to be inputted and outputted are variable bit-rates, these bit-rates may be fixed bit-rates. Incidentally, in the circuit illustrated in FIG. 7, the same reference numbers will be applied to the same blocks as that illustrated in FIG. 5 and the description thereof will be omitted.

Figure 8:
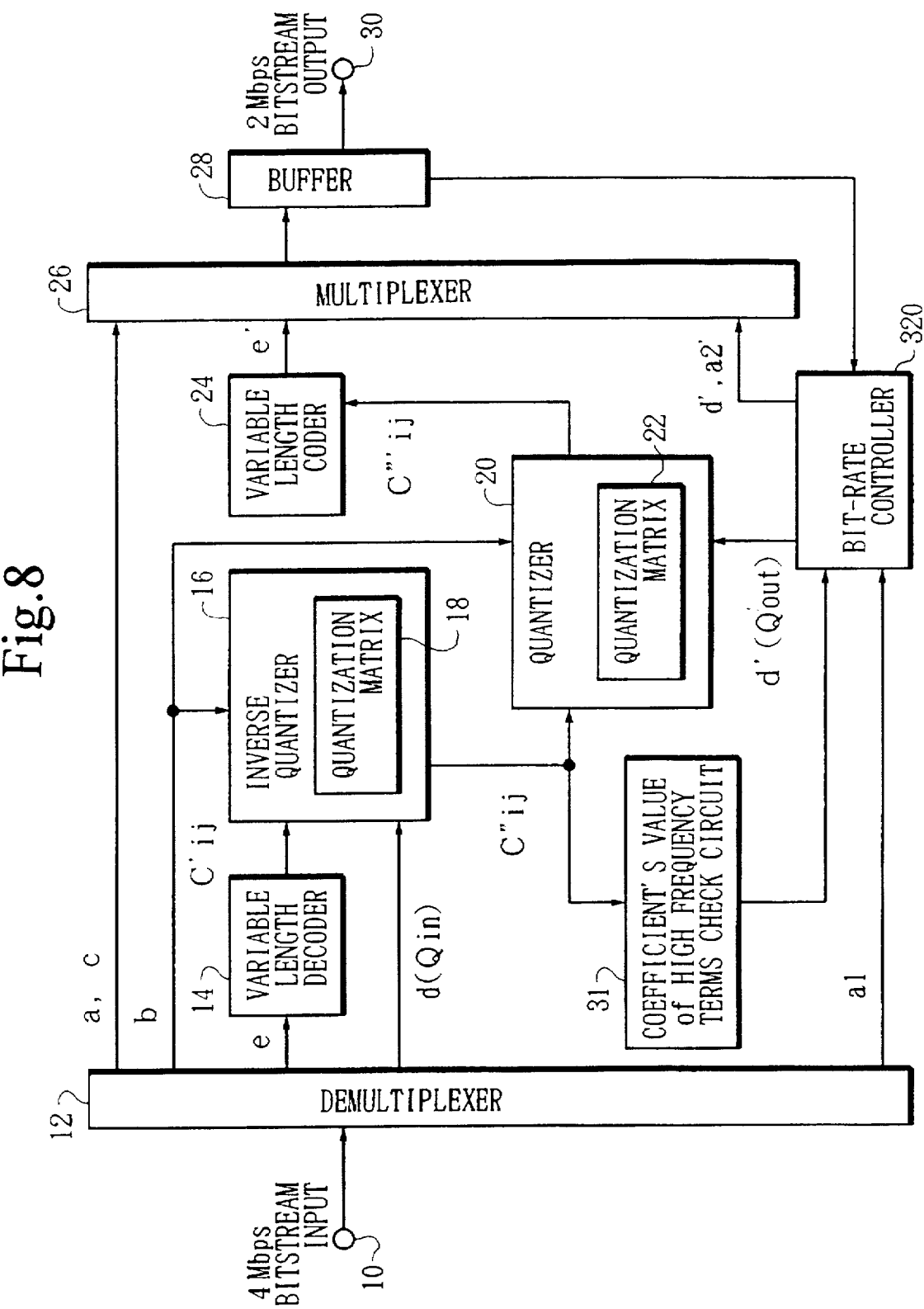
FIG. 8 is a block diagram illustrating the circuit configuration of an apparatus according to the fourth embodiment of the present invention.

Now, description will be given to the fourth preferred embodiment referring to FIG. 8. In FIG. 8, instead of the bit-rate controller 32 in FIG. 3, a bit-rate controller 320 and a coefficient's value of high frequency terms check circuit 31 are provided. Furthermore, as an input into the bit-rate controller 320, in addition to the result of the monitor of the buffer 28 illustrated in FIG. 3 and the picture type data(a1), the data from the coefficient's value check circuit 31 is additionally employed.

The coefficient's value check circuit 31 monitors coefficient's value of high frequency terms among the coefficients C''ij outputted from the inverse quantizer 16, and if the coefficient's value of high frequency terms exceeds the preset upper limit or if the coefficient's value of high frequency terms fall short of the preset lower limit, this result is sent to the bit-rate controller 320. If the coefficient's value of high frequency terms exceeds the preset upper limit, the bit-rate controller 320 controls the second quantizer scale Qout to be larger and raises the compression rate, and if the coefficient's value of high frequency terms fall short of the preset lower limit, the bit-rate controller 320 controls the second quantizer scale Qout to be smaller and lowers the compression rate.

Here, in this description, "larger" means "larger than the value of the third embodiment determined only by the result of monitor by the buffer 28 and the picture type data(a1)," and "smaller" means "smaller than the value of the third embodiment determined only by the result of monitor by the buffer 28 and the picture type data(a1)."

By controlling in this way, in a scene in which the degradation in the picture quality is conspicuous, the compression rate is not raised much, and in a scene in which the degradation in the picture quality is not conspicuous, the compression rate is greatly raised, and thereby an effect that the amount of the data can be reduced to a desired value as a whole can be achieved. That is, even if the amount of the data is reduced, an effect that the degradation in the picture quality can be minimized can be achieved.

Incidentally, the following arrangement may be employed in the above fifth embodiment. The checking circuit 31 detects the coefficient's value of high frequency terms and sends the resultant value to the bit-rate controller 320. It is to be noted that, in this case, the circuit 31 does not compare the value with the upper limit and the lower limit. Receiving the coefficient's value of high frequency terms from the circuit 31, the bit-rate controller 320 decides on whether the coefficient's value of high frequency terms falls within the range between the upper limit and the lower limit by comparing of the value with the upper limit and the lower limit.

Figure 9:
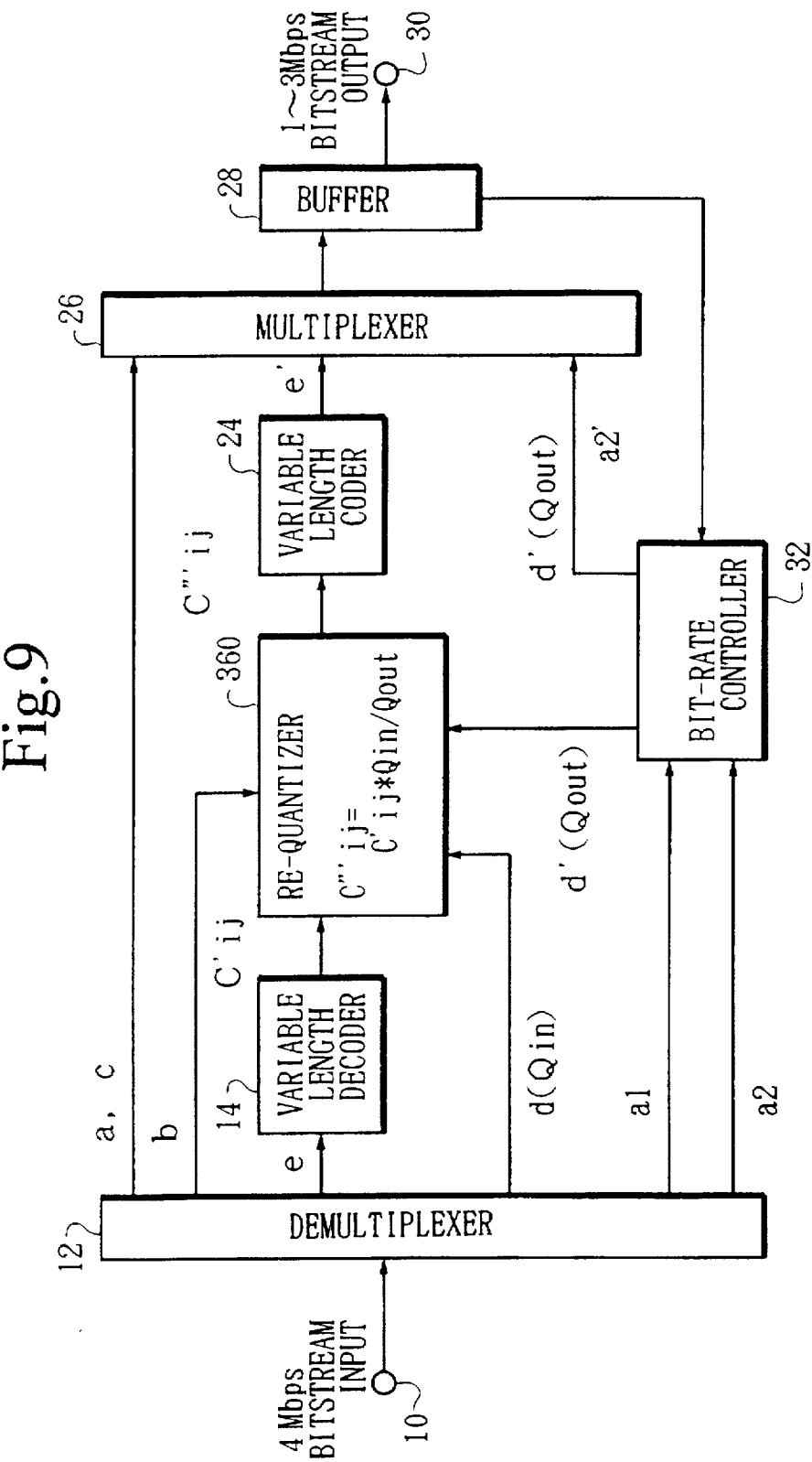
FIG. 9 is a block diagram illustrating the circuit configuration of an apparatus according to the fifth embodiment of the present invention.

This time, referring to FIG. 9, the fifth preferred embodiment will be described. In FIG. 9, as an input into the bit-rate controller 32, in addition to the result of monitor by the buffer 28 and the picture type data(a1), a transfer bit-rate data(a2) is additionally employed. Incidentally, in FIG. 9, the bit-rate of the first bitstream is fixed bit-rate at least for a certain duration, and the data indicating the first bit-rate of that duration is included in the first bitstream as the transfer bit-rate data(a2). This transfer bit-rate data(a2) is a data which serves as an index of the compression rate of the scene controlled by that transfer bit-rate data(a2). By capturing the transfer bit-rate data(a2) in this way, the optimum second quantizer scale Qout according to the scene can be obtained.

Figure 10:
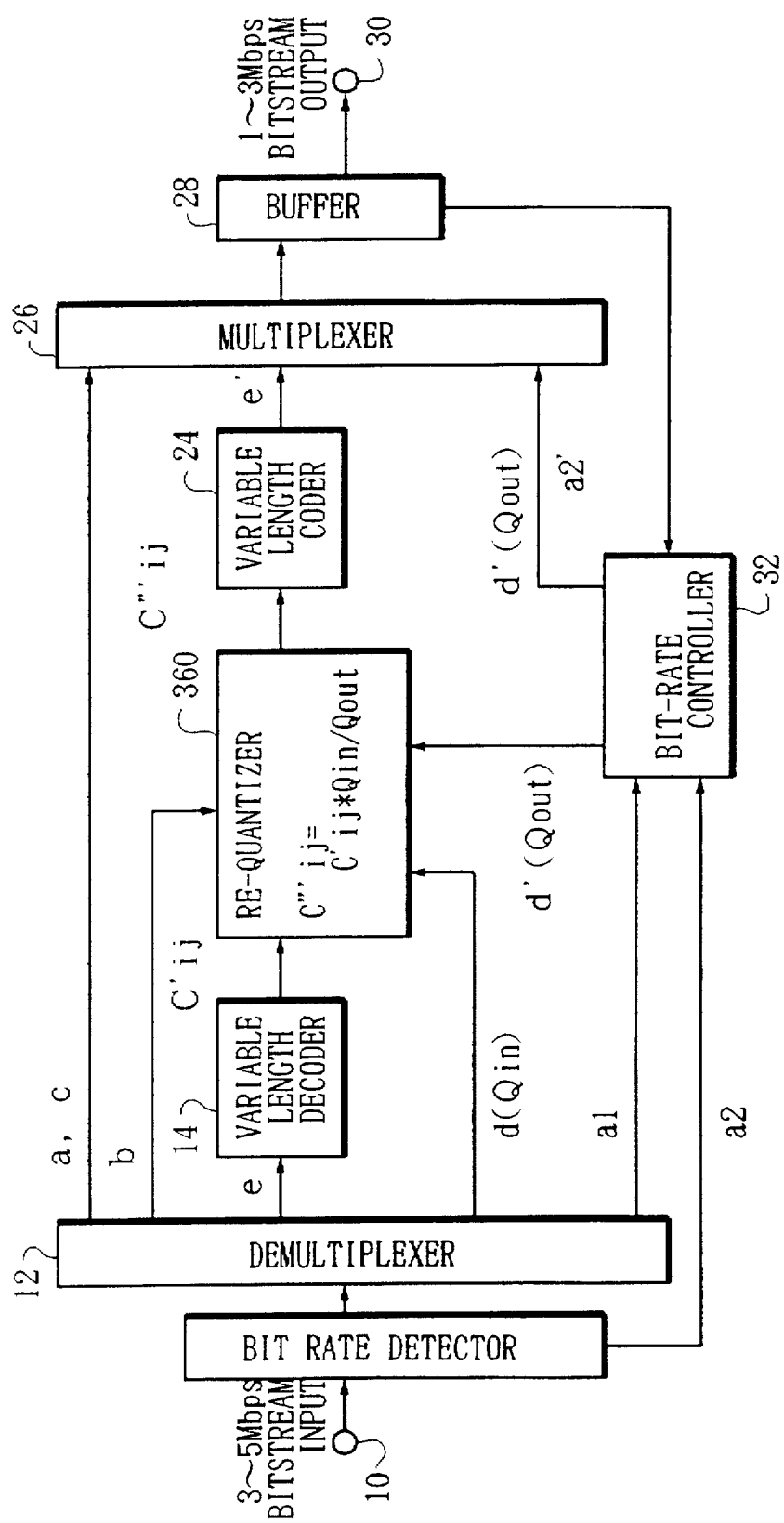
FIG. 10 is a block diagram illustrating the circuit configuration of an apparatus according to the sixth embodiment of the present invention which is partly different from the first, second, third, fourth and fifth embodiment respectively.

Then, referring to FIG. 10, the sixth preferred embodiment will be described. In FIG. 10, a bit-rate detector 11 is provided before the demultiplexer 12 illustrated in FIG. 9, and the bit-rate detected by this bit-rate detector 11 is inputted into the bit-rate controller 32. That is, in the circuit illustrated in FIG. 10, the bitstream with variable bit-rate which does not contain the transfer bit-rate data(a2) is inputted. In this configuration, by detecting the first bit-rate by the bit-rate detection circuit 11 and sending the result thereof to the bit-rate controller 32, the optimum second quantizer scale Qout according to the character of each scene can be obtained in the same way as the circuit illustrated in FIG. 9. When the first quantizer scale Qin is larger than the second quantizer scale Qout, the quantization can be performed by using not the second quantizer scale Qout but the first quantizer scale Qout. In this case, conversion of the bitstream from the first bit-rate to the second bit-rate is not performed. Incidentally, In FIGS. 9 and 10, that the second bit-rate of the second bitstream (output bitstream) is in a range from 1 to 3 Mbps means that the bitstreams with variable bit-rates within this range can be outputted.

We claim:

1. A bit-rate conversion circuit which converts an input bitstream from a first bit-rate to a second bit-rate, the input bitstream including main data having a changeable length, comprising:

means for dividing the input bitstream into the main data and the remaining data;

means for controlling a variable relating to a ratio of length-changing of the main data so that the second bit-rate becomes a target value;

means for changing the length of the main data based on the variable to output changed main data; and means for combining the changed main data with the remaining data.

2. A bit-rate conversion circuit according to claim 1, wherein the controlling means monitors the second bit-rate and controls the variable relating to the ratio of length-changing of the main data so that the second bit-rate becomes the target value.

3. A bit-rate conversion circuit which converts a first bitstream having a first bit-rate into a second bitstream having a second bit-rate, the first bitstream including main data having a changeable length, comprising:

a demultiplexer for demultiplexing the first bitstream into the main data and the remaining data;

a rate-controller for controlling a variable relating to a ratio of length-changing of the main data so that the second bit-rate becomes a target value;

a changer for changing the length of the main data based on the variable to output changed main data; and a multiplexer for multiplexing the changed main data with the remaining data to output the second bitstream.

4. A bit-rate conversion circuit according to claim 3, wherein the rate-controller monitors the second bit-rate and controls the variable relating to the ratio of length-changing of the main data so that the second bit-rate becomes the target value.

5. A bit-rate conversion circuit which converts a first bitstream having a first bit-rate into a second bitstream having a second bit-rate, the first bitstream including a first main code having a changeable length, the first bitstream being obtained by compressing a motion video sequence, comprising:

a demultiplex circuit for demultiplexing the first bitstream into the first main code and the remaining data;

a decoder for variable length decoding the first main code into first main data;

a reduction circuit for reducing the amount of the first main data based on the second bit-rate to output second main data;

an encoder for variable length coding the second main data to output a second main code; and a multiplex circuit for multiplexing the second main code with the remaining data to output the second bitstream.

6. A bit-rate conversion circuit which converts a first bitstream having a first bit-rate into a second bitstream having a second bit-rate, the first bitstream including a first DCT (Discrete Cosine Transformation)-coefficient code, the first bitstream being obtained by compressing a motion video sequence, comprising:

a demultiplex circuit for demultiplexing the first bitstream into the first DCT-coefficient code and the remaining data;

a decoder for variable length decoding the first DCT-coefficient code into first DCT-coefficient data;

an inverse quantizer for inverse quantizing the first DCT-coefficient data to output inverse quantized data;

a quantizer for quantizing the inverse quantized data using a quantizer scale to output second DCT-coefficient data;

a bit-rate controller for controlling the quantizer scale so that the second bit-rate becomes a target value;

an encoder for variable length coding the second DCT-coefficient data to output a second DCT-coefficient code; and a multiplex circuit for multiplexing the second DCT-coefficient code with the remaining data to output the second bitstream.

7. A bit-rate conversion circuit according to claim 6, wherein said each of first and second bitstreams is a code row conforming to the MPEG (Moving Picture Experts Group) standard.

8. A bit-rate conversion circuit according to claim 7, wherein said bit-rate controller controls said quantizer scale by referring to bit-rate data obtained from said first bitstream.

9. A bit-rate conversion circuit according to claim 7, wherein said bit-rate controller controls said quantizer scale by reffering to the DCT-coefficient's value of high frequency terms inputted from said inverse quantizer.

10. A bit-rate conversion circuit according to claim 9, wherein said bit-rate controller controls said quantizer scale to a larger value if said DCT-coefficient's value of high frequency terms exceeds a specified preset value.

11. A bit-rate conversion circuit according to claim 7, further comprising a detection circuit for detecting a bit-rate of said first bitstream; and wherein said bit-rate controller controls said quantizer scale by reffering to the bit-rate detected by the detection circuit.

12. A bit-rate conversion circuit according to claim 6, wherein said bit-rate controller controls said quantizer scale by referring to bit-rate data obtained from said first bitstream.

13. A bit-rate conversion circuit according to claim 6, wherein said bit-rate controller controls said quantizer scale by reffering to the DCT-coefficient's value of high frequency terms inputted from said inverse quantizer.

14. A bit-rate conversion circuit according to claim 13, wherein said bit-rate controller controls said quantizer scale to a larger value if said DCT-coefficient's value of high frequency terms exceeds a specified preset value.

15. A bit-rate conversion circuit according to claim 6, further comprising a detection circuit for detecting a bit-rate of said first bitstream; and wherein said bit-rate controller controls said quantizer scale by reffering to the bit-rate detected by the detection circuit.

16. A bit-rate conversion circuit which converts an input bitstream from a first bit-rate to a second bit-rate, the input bitstream including a first DCT (Discrete Cosine Transformation)-coefficient code, the input bitstream being obtained by compressing a motion video sequence, comprising:

a division circuit for dividing the input bitstream into the first DCT-coefficient code and the remaining data;

a decoder for variable length decoding the first DCT-coefficient code into first DCT-coefficient data;

an inverse quantizer for inverse quantizing the first DCT-coefficient data to output inverse quantized data;

a quantizer for quantizing the inverse quantized data using a quantizer scale to output second DCT-coefficient data;

a bit-rate controller for controlling the quantizer scale so that the second bit-rate becomes a target value;

an encoder for variable length coding the second DCT-coefficient data to output a second DCT-coefficient code; and a combination circuit for combining the second DCT-coefficient code with the remaining data.

17. A bit-rate conversion circuit according to claim 16, wherein said bitstream is a code row conforming to the MPEG standard.

18. A bit-rate conversion circuit according to claim 17, wherein said bit-rate controller controls said quantizer scale by referring to bit-rate data obtained from said input bitstream.

19. A bit-rate conversion circuit according to claim 17, wherein said bit-rate controller controls said quantizer scale by reffering to the DCT-coefficient's value of high frequency terms inputted from said inverse quantizer. of high frequency terms exceeds a specified preset value.

20. A bit-rate conversion circuit according to claim 19, wherein said bit-rate controller controls said quantizer scale to a larger value if said DCT-coefficient's value of high frequency terms exceeds a specified preset value.

21. A bit-rate conversion circuit according to claim 17, further comprising a detection circuit for detecting a bit-rate of said input bitstream; and wherein said bit-rate controller controls said quantizer scale by reffering to the bit-rate detected by the detection circuit.

22. A bit-rate conversion circuit according to claim 16, wherein said bit-rate controller controls said quantizer scale by referring to bit-rate data obtained from said input bitstream.

23. A bit-rate conversion circuit according to claim 16, wherein said bit-rate controller controls said quantizer scale by reffering to the DCT-coefficient's value of high frequency terms inputted from said inverse quantizer.

24. A bit-rate conversion circuit according to claim 23, wherein said bit-rate controller controls said quantizer scale to a larger value if said DCT-coefficient's value of high frequency terms exceeds a specified preset value.

25. A bit-rate conversion circuit according to claim 16, further comprising a detection circuit for detecting a bit-rate of said input bitstream; and wherein said bit-rate controller controls said quantizer scale by reffering to the bit-rate detected by the detection circuit.

26. A bit-rate conversion circuit which converts a first bitstream having a first bit-rate into a second bitstream having a second bit-rate, the first bitstream including a first DCT (Discrete Cosine Transformation)-coefficient code and a first quantizer scale, the first bitstream being obtained by compressing a motion video sequence, comprising:

a division circuit for dividing the first bitstream into the first DCT-coefficient code, the first quantizer scale and the remaining data;

a decoder for variable length decoding the first DCT-coefficient code into first DCT-coefficient data;

a re-quantization circuit for, dividing the first quantizer scale by a second quantizer scale, multiplying the resultant ratio by the first DCT-coefficient data to output second DCT-coefficient data;

a bit-rate controller for controlling the second quantizer scale so that the second bit-rate becomes a target value;

an encoder for variable length coding the second DCT-coefficient data to output a second DCT-coefficient code; and a combination circuit for combining the second DCT-coefficient code, the second quantizer scale and the remaining data to output the second bitstream having the second bit-rate.

27. A bit-rate conversion circuit according to claim 26, wherein said re-quantization circuit comprising:

a division circuit for dividing said first quantizer scale by said second quantizer scale to output a ratio;

a multiplying circuit for multiplying the ratio by said first DCT-coefficient data to output said second DCT-coefficient data.

28. A bit-rate conversion circuit according to claim 27, wherein said first and second bitstreams are code rows conforming to the MPEG standard.

29. A bit-rate conversion circuit according to claim 28, wherein said bit-rate controller controls said second quantizer scale by referring to bit-rate data obtained from said first bitstream.

30. A bit-rate conversion circuit according to claim 27, wherein said bit-rate controller controls said second quantizer scale by referring to bit-rate data obtained from said first bitstream.

31. A bit-rate conversion circuit according to claim 26, wherein said first and second bitstreams are code rows conforming to the MPEG standard.

32. A bit-rate conversion circuit according to claim 31, wherein said bit-rate controller controls said second quantizer scale by referring to bit-rate data obtained from said first bitstream.

33. A bit-rate conversion circuit according to claim 26, wherein said bit-rate controller controls said second quantizer scale by referring to bit-rate data obtained from said first bitstream.

34. A method for converting a first bitstream having a first bit-rate into a second bitstream having a second bit-rate, the first bitstream including main data having a changeable length, comprising the steps of:

dividing the first bitstream into the main data and the remaining data;

controlling a variable relating to a ratio of length-changing of the main data so that the second bit-rate becomes a target value;

changing the length of the main data based on the variable; and combining the changed main data with the remaining data.

35. A method for converting a first bit-stream having a first bit-rate into a second bit-stream having a second bit-rate according to claim 34, wherein the controlling step comprises the steps of monitoring the second bit-rate and controlling the variable relating to the ratio of length-changing of the main data so that the second bit-rate becomes the target value.

36. A method for converting a first bitstream having a first bit-rate into a second bitstream having a second bit-rate, the first bitstream being obtained by compressing a motion video sequence, comprising the steps of:

dividing the first bitstream into the first DCT-coefficient code and the remaining data;

variable length decoding the first DCT-coefficient code;

inverse quantizing the variable length decoded data;

quantizing the inverse quantized data using a quantizer scale controlled so that the second bit-rate becomes a target value;

variable length coding the quantized data to output a second DCT-coefficient code; and combining the second DCT-coefficient code with the remaining data.

37. An apparatus for converting a first bitstream having a first bit-rate into a second bitstream having a second bit-rate, the first bitstream being obtained by compressing a motion video sequence, comprising:

a bit-rate conversion circuit according to any one of claims 1–3, 5–16, 26, 34–36 means for inputting a target value of said second bit-rate.

38. An apparatus according to claim 37, wherein said inputting means specifies a range and typical value of said second bit-rate.

* * * * *